United States Patent
Barral et al.

(10) Patent No.: US 11,091,686 B2
(45) Date of Patent: Aug. 17, 2021

(54) COMPOSITIONS AND METHODS FOR COMPLETING SUBTERRANEAN WELLS

(71) Applicant: Schlumberger Technology Corporation, Sugar Land, TX (US)

(72) Inventors: Quentin Barral, Clamart (FR); Nicolas Droger, Clamart (FR); Slaheddine Kefi, Clamart (FR); Loic Regnault De La Mothe, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 171 days.

(21) Appl. No.: 15/542,973

(22) PCT Filed: Jan. 7, 2016

(86) PCT No.: PCT/EP2016/000009
§ 371 (c)(1),
(2) Date: Jul. 12, 2017

(87) PCT Pub. No.: WO2016/116255
PCT Pub. Date: Jul. 28, 2016

(65) Prior Publication Data
US 2018/0010032 A1    Jan. 11, 2018

(30) Foreign Application Priority Data
Jan. 21, 2015  (EP) .................................... 15290015

(51) Int. Cl.
*C09K 8/40* (2006.01)
*C09K 8/52* (2006.01)
*E21B 37/00* (2006.01)
*E21B 33/14* (2006.01)

(52) U.S. Cl.
CPC ................. *C09K 8/40* (2013.01); *C09K 8/52* (2013.01); *E21B 37/00* (2013.01); *E21B 33/14* (2013.01)

(58) Field of Classification Search
CPC .. C09K 8/40; C09K 8/52; E21B 37/00; E21B 33/14
See application file for complete search history.

(56) References Cited

U.S. PATENT DOCUMENTS

| 5,830,831 A | 11/1998 | Chan et al. |
| 6,035,936 A * | 3/2000 | Whalen .................... C09K 8/68 166/308.3 |
| 7,618,926 B1 | 11/2009 | Pakulski |
| 2003/0166472 A1* | 9/2003 | Pursley ................. C09K 8/035 507/200 |
| 2006/0073986 A1 | 4/2006 | Jones et al. |
| 2008/0274918 A1* | 11/2008 | Quintero .................. C09K 8/52 507/116 |
| 2009/0008091 A1 | 1/2009 | Quintero et al. |
| 2009/0200033 A1 | 8/2009 | Kakadjian et al. |
| 2011/0024113 A1* | 2/2011 | Chen ........................ C09K 8/40 166/292 |
| 2013/0261033 A1* | 10/2013 | Nguyen ................. C09K 8/602 507/240 |

FOREIGN PATENT DOCUMENTS

WO    01/42387 A1    6/2001

OTHER PUBLICATIONS

Heathman et al. (US H1932 H) (Year: 2001).*
Daccord et al., "Mud Removal", Well Cementing—2nd Edition, Houston: Schlumberger, pp. 183-187, 2006.
International Search Report and Written Opinion issued in International Patent Application No. PCT/EP2016/000009 dated Mar. 11, 2016; 10 pages.
Search Report issued in European Patent Appl. No. 15290015.5 dated Jun. 2, 2015; 5 pages.

* cited by examiner

*Primary Examiner* — Crystal J Miller

(57) ABSTRACT

Well treatment compositions comprise water, a lipophilic anionic surfactant, a hydrophilic non-ionic surfactant, a second non-ionic surfactant, a water-solubilizing solvent, a water-immiscible solvent and a lipophilic non-ionic surfactant. Optionally, a second solvent may be incorporated. When added to spacer fluids, chemical washes or both, the compositions promote the removal of non-aqueous drilling fluids from casing surfaces. Additionally, the treated casing surfaces are water wet, thereby promoting optimal bonding to cement.

11 Claims, No Drawings

COMPOSITIONS AND METHODS FOR COMPLETING SUBTERRANEAN WELLS

BACKGROUND

The statements in this section merely provide background information related to the present disclosure and may not constitute prior art.

This disclosure relates to compositions and methods for completing, subterranean wells, in particular, fluid compositions and methods for completion operations during which the fluid compositions are pumped into a wellbore and make contact with subterranean rock formations.

In the course of completing oil and gas wells and the like, various types of fluids are circulated in the wellbore. These fluids include, but are not limited to, drilling fluids, spacer fluids, cement slurries and gravel-packing fluids. In addition, these fluids typically contain solid particles.

Cement slurries are usually incompatible with most drilling fluids. If the cement slurry and drilling fluid commingle, a highly viscous mass may form that can cause several problems. Cement slurry can channel through the viscous mass. Unacceptably high friction pressures can develop during the cement job. Plugging of the annulus can result in job failure. In all of these situations, zonal isolation may be compromised, and expensive remedial cementing may be required.

Consequently, intermediate fluids called preflushes are often pumped as buffers to prevent contact between cement slurries and drilling fluids. Preflushes can be chemical washes that contain no solids or spacer fluids that contain solids and can be mixed at various densities.

Chemical washes are preflushes with a density and a viscosity very close to that of water or oil. The simplest chemical wash is fresh water; however, for more efficient drilling-fluid thinning and dispersion, chemical washes that contain dispersants and surfactants are more commonly used.

Spacers are preflushes with carefully designed densities and rheological properties. Spacers are more complicated chemically than washes. Viscosifiers are necessary to suspend the solids and control the rheological properties, and usually comprise water-soluble polymers, clays or both. Other chemical components include dispersants, fluid-loss control agents, weighting agents, antifoam agents and surfactants. A thorough discussion concerning the uses and compositions of preflushes may be found in the following publication. Daccord G, Guillot D and Nilsson F: "*Mud Removal*," in Nelson E B and Guillot D (eds.): *Well Cementing*—$2^{nd}$ Edition, Houston: Schlumberger (2006) 183-187.

A third option is to use a sacrificial volume of cement slurry, known as a scavenger slurry. The scavenger slurry mixes with the drilling fluid (and will have degraded properties) ahead of the useful volume of cement slurry.

For optimal fluid displacement, the density of a spacer fluid should usually be higher than that of the drilling fluid and lower than that of the cement slurry. Furthermore, the viscosity of the spacer fluid is usually designed to be higher than the drilling fluid and lower than the cement slurry. The spacer fluid must remain stable throughout the cementing process (i.e., no free-fluid development and no sedimentation of solids). In addition, it may be necessary to control the fluid-loss rate.

Another important function of preflushes is to leave the casing and formation surfaces water wet, thereby promoting optimal bonding with the cement. Achieving water-wet surfaces may be challenging, especially when the drilling fluid has been non-aqueous. Such non-aqueous fluids (NAF) may be oil-base muds or emulsion muds whose external phase is oil-base. For these circumstances, special dispersant and surfactant systems have been developed by the industry. Designing a dispersant/surfactant system for a particular well may be complicated because several parameters must be considered, including the base oil of the NAF, the presence of emulsifiers, the fluid density, bottomhole temperature, presence of brine salts and the chemical nature of the cement system.

SUMMARY

In an aspect, embodiments relate to well treatment compositions, comprising water, a lipophilic anionic surfactant, a hydrophilic non-ionic surfactant, a second non-ionic surfactant, a water-solubilizing solvent, a water-immiscible solvent and a lipophilic non-ionic surfactant.

In a further aspect, embodiments relate to methods for treating a subterranean well having at least one casing string, comprising preparing an aqueous spacer fluid, chemical wash or both and adding a well treatment composition to the fluid, wash or both. The composition comprises water, a lipophilic anionic surfactant, a hydrophilic non-ionic surfactant, a second non-ionic surfactant, a water-solubilizing solvent, a water-immiscible solvent and a lipophilic non-ionic surfactant. Then the fluid, wash or both containing the composition are placed in the well such that the fluid, wash or both flow past the external surface of the casing string.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The authors have discovered improved compositions and methods for removing NAF drilling fluids from casing surfaces and leaving the surfaces water wet. In addition, the compositions may provide improved environmental suitability and compliance with local environmental regulations.

In an aspect, embodiments relate to well treatment compositions. The compositions comprise water, a lipophilic anionic surfactant, a hydrophilic non-ionic surfactant, a second non-ionic surfactant, a water-solubilizing solvent, a water-immiscible solvent and a lipophilic non-ionic surfactant. The water concentration may be between 5 and 50 wt %, or may be between 7 and 30 wt %. The lipophilic anionic surfactant concentration may be between 1 and 75 wt %, or may be between 3 and 40 wt %. The hydrophilic non-ionic surfactant concentration may be between 1 and 75 wt %, or may be between 3 and 20 wt %. The second non-ionic surfactant concentration may be between 1 and 75 wt %, or may be between 3 and 50 wt %. The water-solubilizing solvent concentration may be between 3 and 75 wt %, or may be between 15 and 60 wt %. The water-immiscible solvent concentration may be between 3 and 75 wt % or may be between 15 and 60 wt %. The lipophilic non-ionic surfactant concentration may be between 0.5 and 30 wt % or may be between 2 and 15 wt %. The concentration ratio between the anionic surfactant and all three non-ionic surfactants may be between 1:10 and 10:1, or may be between 1:4 and 2:1.

The anionic surfactant may comprise oil-soluble alkaline, alkaline earth metal and amine salts of dodecylbenzenesulfonic acid, alkylsulfuric acid, alkylsulfonic acid, alpha olefin sulfonic acid, alkyl sulfosuccinic acid, alkyl ether sulfosuccinic acid, alkyl ether sulfuric acid, alkyl ether sulfonic acid, carboxylic acid, lignosulfonic acid, phosphonate esters, phosphate esters, phosphonated polyglycol ethers or phosphated polyglycol ethers or combinations thereof, wherein the hydrophilic/lipophilic balance (HLB) number is below 30. The HLB number may be below 25. The anionic surfactant may have one, two or three alkyl chains or branched alkyl chains or both. The anionic surfactant may comprise an alkyl sulfosuccinate.

The hydrophilic non-ionic surfactant may comprise alkoxylated alcohols, alkoxylated mercaptans, alkoxylated alkylphenols, alkoxylated tristyrylphenols, alkoxylated castor oil, alkoxylated esters, alkoxylated diesters, alkoxylated alkylamines, alkoxylated alkylamides, copolymers of polyalkylene glycol, random sorbitan mono- or polyesters, di-block sorbitan mono- or polyesters, tri-block sorbitan mono- or polyesters, ethoxylated sorbitan monoesters, ethoxylated sorbitan polyesters, betaines, hydroxysultaines, taurines, sarcosinates, alkyl imidazolines, amphoacetates, amphoprionates, amphosulfonates, alkyl polyglucosides, phosphatidylcholines, lipoamino acids, polypeptides, glycolipids, rhamnolipids or flavolipids or combinations thereof, wherein the HLB number is between 12 and 17. The HLB number may be between 13 and 16. The hydrophilic non-ionic surfactant may comprise an alkyl ethoxylate.

The second non-ionic surfactant may comprise alkoxylated alcohols, alkoxylated mercaptans, alkoxylated alkylphenols, alkoxylated tristyrylphenols, alkoxylated castor oil, alkoxylated esters, alkoxylated diesters, alkoxylated alkylamines, alkoxylated alkylamides, copolymers of polyalkylene glycol, random sorbitan mono- or polyesters, di-block sorbitan mono- or polyesters, tri-block sorbitan mono- or polyesters, ethoxylated sorbitan monoesters, ethoxylated sorbitan polyesters, betaines, hydroxysultaines, taurines, sarcosinates, alkyl imidazolines, amphoacetates, amphoprionates, amphosulfonates, alkyl polyglucosides, phosphatidylcholines, lipoamino acids, polypeptides, glycolipids, rhamnolipids or flavolipids or combinations thereof, wherein the HLB number is between 7 and 14. The HLB number may be between 8 and 13. The second non-ionic surfactant may comprise propoxylated and ethoxylated alcohols.

Those skilled in the art will recognize that the hydrophilic non-ionic surfactant and the second non-ionic surfactant may be identical, provided their HLB numbers are within their prescribed ranges.

The water-solubilizing solvent may comprise linear or branched small chain alcohols according to the formula $C_xH_{(2x+1)}OH$ with x below 7, glycol ethers, dioxolanes, hydroxypyrrolidones, dimethylsulfoxide, dimethylformamide, acetic acid, acetone or amines or combinations thereof. The water-solubilizing solvent may comprise glycol ether. The water-solubilizing solvent may comprise butoxyethanol.

The water-immiscible solvent may comprise mineral oil, aliphatic hydrocarbons, aromatic hydrocarbons or both.

The lipophilic non-ionic surfactant may comprise cocamide diethanolamide, alkoxylated alcohols, alkoxylated mercaptans, alkoxylated alkylphenols alkoxylated tristyrylphenols, alkoxylated castor oil, alkoxylated esters, alkoxylated diesters, alkoxylated alkylamines, alkoxylated alkylamides, copolymers of polyalkylene glycol, random sorbitan mono- or polyesters, di-block sorbitan mono- or polyesters, tri-block sorbitan mono- or polyesters, ethoxylated sorbitan monoesters, ethoxylated sorbitan polyesters, betaines, hydroxysultaines, taurines, sarcosinates, alkyl imidazolines, amphoacetates, amphoprionates, amphosulfonates, alkyl polyglucosides, phosphatidylcholines, lipoamino acids, polypeptides, glycolipids, rhamnolipids or flavolipids or combinations thereof, wherein water solubility is less than 1 g per liter.

For applications where the drilling fluid base oil is paraffinic or olefinic, the composition may further comprise a second solvent comprising branched long-chain alcohols according to the formula $C_xH_{(2x+1)}OH$ with x above 4, propoxylated alcohols, terpenes, pyrrolidones, pyrrolidines, aromatic solvents or halogenated solvents or combinations thereof. The second solvent may comprise 2-ethyl-hexan-1-ol. The second solvent concentration may be between 5 and 50 wt %, or between 10 and 40 wt %.

In a further aspect, embodiments relate to methods for treating a subterranean well having at least one casing string. The method comprises preparing an aqueous spacer fluid, chemical wash or both and adding a well treatment composition to the fluid, wash or both. The composition comprises water, a lipophilic anionic surfactant, a hydrophilic non-ionic surfactant, a second non-ionic surfactant, a water-solubilizing solvent, a water-immiscible solvent and a lipophilic non-ionic surfactant. Then the fluid, wash or both containing the composition are placed in the well such that the fluid, wash or both flow past the external surface of the casing string. Details concerning the various compositional components and compositional ratios, including a second solvent, have been described previously. The concentration of the composition in the fluid, wash or both may be between 0.25 and 20 wt %, or between 2.5 and 10 wt %.

Further illustration of the disclosure is provided by the following examples.

EXAMPLES

As discussed earlier, effective NAF removal from casing and wellbore surfaces promotes cementing success. Four laboratory methods were used for evaluating the performance of the disclosed compositions, and the methods pertain to the present examples.

The first method was a rotor test to evaluate the ability of chemical-wash compositions to remove NAF from casing surfaces at a temperature of 66 deg C. [150 deg F.]. Unless otherwise noted, the chemical wash solutions were prepared by diluting 10 vol % of the surfactant-solvent composition in water (unsalted case) or water with mass fraction of 5% KCl (5% KCl case). The test equipment was a Chan 35™ rotational rheometer, available from Chandler Engineering, Tulsa, Okla., USA. The rheometer was equipped with a cup with an 85-mm diameter. Two closed rotors, each 76.4 mm high and 40.6 mm in diameter, were employed to simulate the casing surface and provide an evaluation of test repeatability. Both rotors had a sand blasted stainless-steel surfaces with an average roughness of 1.5 µm.

A NAF was prepared and sheared at 6000 RPM in a Silverson mixer for 30 minutes, followed by a 16-hour aging period in a rolling oven at the desired test temperature. The NAF was then transferred to one of the Chan 35™ rheometer cups preheated at the test temperature of 66 deg C. [150 deg F.]. A test rotor was weighted ($w_0$) and then lowered into the NAF to a depth of 50 mm. The rotor was then rotated within the NAF for one minute at 100 RPM and then left to soak in the NAF for five minutes. Next, the rotor was removed from the NAF and left to drain for two minutes. The bottom of the rotor was wiped clean and then weighed ($w_1$). The rotor was then remounted on the rheometer and immersed in a cup containing the chemical wash at 66 deg C. [150 deg F.] such that the NAF layer was just covered by the chemical wash. The rotor was rotated for 10 minutes at 100 RPM. The rotor when then removed from the chemical wash and left to drain for two minutes. The bottom of the rotor was wiped clean and weighed ($w_2$). The NAF removal efficiency R was then determined by Eq. 1.

$$R = \frac{w_1 - w_2}{w_1 - w_0} \qquad \text{(Eq. 1)}$$

The tests were repeated at least twice, and the results were averaged to obtain a final result. Rotor surface wettability is estimated by placing a droplet of water on the surface after cleaning and measuring contact angle. It is desirable to achieve an R value higher than 75% with a water-wet surface (contact angle lower than 30°).

The second method involved spacer fluids containing the disclosed compositions, and determined the amount of spacer fluid necessary to invert a NAF emulsion, causing the external phase to become aqueous. The method used a Waring blender equipped with a glass bowl. The glass bowl was modified such that two electrodes were placed horizontally across the glass wall. The distance between the electrodes was 2.4 cm. The electrodes were connected to AC current through a potentiometer.

The method consisted of the following steps.

1. The spacer fluid and NAF were conditioned separately in atmospheric consistometers at the desired test temperature for 30 minutes.
2. 400 mL of spacer fluid were poured into the glass bowl and mixed at 1000 RPM.
3. The electrical current between the electrodes immersed in the spacer fluid was adjusted to be 3 mA.
4. The glass bowl was emptied and cleaned.
5. 400 mL of NAF were poured into the glass bowl and mixed at 1000 RPM.
6. Spacer fluid was added incrementally to the NAF in the glass bowl. After each addition, a 14-mL sample was collected for measuring rheological properties with a Malvern Bohlin rheometer. As the spacer was added, the conductivity of the fluid was continuously measured. When the conductivity of the test fluid reached 1.5 mA, the NAF was considered to have converted from a resistive fluid to a conductive fluid.

Under these conditions, in the absence of solvent or surfactant in the spacer fluid, the inversion regularly occurs at a spacer/NAF ratio of about 55/45. Achieving inversion at spacer/NAF ratios below 35/65 is desirable.

The third method was a rheological compatibility evaluation between the NAF and the spacer fluid. The viscosities of both pure fluids at a shear rate of 170 s$^{-1}$ were first determined. As described earlier, samples of spacer-fluid/NAF ratio mixtures were gathered during the NAF stability testing. The viscosity of each sample was determined and compared to the higher value between pure NAF viscosity and pure spacer viscosity. The difference between the mixture and pure viscosities (mixture minus pure) is called the "R-index." The highest R-index that occurs across the spacer-fluid/NAF ratio spectrum is called the "absolute R-index." The lower the absolute R-index, the more compatible the fluids are. In case, all sample viscosities are lower than pure NAF viscosity and pure spacer viscosity, a negative R-index is determined by taking the difference between the lowest sample viscosity and the lower value between pure NAF viscosity and pure spacer viscosity. Achieving an absolute R-index between −10 and +10 is desirable.

The fourth method was the measurement of the effect of the disclosed compositions on cement slurry thickening time. The cement slurry density was 1970 kg/m$^3$ (16.4 lbm/gal). The composition was Lehigh Class H+25 g/L potassium chloride+3 g/L sodium polynaphthalene sulfonate+3.7 g/L polypropylene glycol+7 g/L D177 UNISET retarder (available from Schlumberger)+40 g/L D168 UNIFLAC fluid loss control agent (available from Schlumberger).

600 mL of base slurry were prepared in a Waring blender. The spacer fluid and cement slurry were conditioned separately in atmospheric consistometers at the desired test temperature for 30 minutes. 540 mL of cement slurry and 60 mL of spacer were both mixed with a spatula (90% of cement volume mixed with 10% of spacer volume).

Thickening-time tests were performed according to the recommended procedure published in the following document—Recommended Practice for Testing Well Cements, ANSI/API Recommended Practice 10B-2, 1st Edition, Washington D.C.: American Petroleum Institute (2005). The relative difference of thickening time at 100 Bc, consistency is evaluated between spacer-contaminated cements with or without the surfactant-solvent spacer additive. Achieving a relative difference of thickening time lower than 10% is desirable.

In the present examples, one non-aqueous (NAF) drilling fluids was used: RHELIANT™ (Synth. B), available from M-I SWACO, Houston, Tex., USA. The RHELIANT™ (Synth. B) formulation was based on synthetic oil (Synthetic B from M-I SWACO), with a 77/23 oil/water ratio. The drilling fluid was weighted with barite to a density of 1600 kg/m$^3$ (13.4 lbm/gal). The two spacer fluids that were tested in the present examples were MUDPUSH™ II spacer fluids, available from Schlumberger, one with a mass fraction of 5% by weight of water of potassium chloride in water (5% KCl case), the other one without potassium chloride (unsalted case), both weighted with barite to a density of 1740 kg/m$^3$ (14.5 lbm/gal). Unless otherwise noted, the spacer solutions were prepared by diluting 10 vol % of the surfactant-solvent composition in MUDPUSH™ II spacer fluids.

Example 1

The following surfactant-solvent blend was prepared in a beaker with a magnetic stirrer, and agitated until the solution was homogeneous.
  5 wt % sodium dioctylsulfosuccinate in glycol-water solution (Geropon™ DOS PG, available from Rhodia).
  13 wt % branched alcohol EO/PO (Antarox™ LA-EP 16, available from Rhodia)
  10 wt % water
  46 wt % solketal
  28 wt % mineral oil (Exxsol™ D100, available from ExxonMobil Chemical)
  3 wt % cocamide diethanolamide (Mackamide™ C5 available from Rhodia)
  Geropon™ DOS PG is an anionic surfactant with an HLB of 23. Antarox™ LA-EP 16 is a non-ionic surfactant with an HLB of 13.1. Solketal is a mutual solvent. Mackamide C5 is a non-ionic surfactant with a water solubility of 15-30 mg/L.
  Rotor tests (unsalted and 5% KCl cases) conducted with the drilling fluid had the following results. RHELIANT™ (Synth B): R=94% (unsalted case) and 75% (5% KCl case), both with final rotor surfaces being water-wet. An emulsion inversion test was performed with the unsalted MUDPUSH II spacer in contact with the RHELIANT™ (Synth B) drilling fluid. The emulsion inverted when the spacer/drilling-fluid ratio was 25/75. Another stability test was performed with 5% KCl MUDPUSH, II spacer in contact with the RHELIANT™ (Synth B) drilling fluid. The emulsion inverted when the spacer/drilling-fluid ratio was 35/65.
  Rheological compatibility tests were performed. The absolute R-indices associated with the unsalted and salted spacers were −3 and −2, respectively.
  For the salted case, the influence of the surfactant-solvent blend on the cement thickening time is shown in Table 1.

TABLE 1

Effect of surfactant-solvent combination on cement slurry thickening time (salted case).

| | Thickening Time @ 55° C. (131° F.) | |
| --- | --- | --- |
| | 30 Bc (hr:min) | 100 Bc (hr:min) |
| No surfactant-solvent | 3:15 | 3:52 |
| 90% Cement contaminated with 10% salted spacer without surfactant-solvent | 5:40 | 6:08 |
| 90% Cement contaminated with 10% salted spacer with 3 gal/bbl surfactant-solvent | 5:15 | 6:06 |

Example 2

The following surfactant-solvent blend was prepared in a beaker with a magnetic stirrer, and agitated until the solution was homogeneous.
  5 wt % Geropon™ DOS PG
  13 wt % Antarox™ LA-EP 16
  10 wt % water
  46 wt % butoxyethanol
  28 wt % Exxsol™ D100
  3 wt % Mackamide™ C5
  Butoxyethanol is a mutual solvent.
  Rotor tests (unsalted and 5% KCl cases) conducted with the drilling fluid had the following results. RHELIANT™ (Synth B): R=89% (unsalted case) and 85% (5% KCl case), both with final rotor surfaces being water-wet.

Example 3

The following surfactant-solvent blend was prepared in a beaker with a magnetic stirrer, and agitated until the solution was homogeneous.
  17 wt % Geropon™ DOS PG
  43 wt % Antarox™ LA-EP 16
  31 wt % water
  9 wt % solketal
  Rotor tests (unsalted and 5% KCl cases) conducted with the drilling fluid had the following results. RHELIANT™ (Synth B): R=1% (unsalted case) and 0% (5% KCl case), both with final rotor surfaces being oil-wet.

Example 4

The following surfactant-solvent blend was prepared in a beaker with a magnetic stirrer, and agitated until the solution was homogeneous.
  8.5 wt % Geropon™ DOS PG
  21.5 wt % Antarox™ LA-EP 16
  15.5 wt % water
  54.5 wt % solketal
  Rotor tests (unsalted and 5% KCl cases) conducted with the drilling fluid had the following results. RHELIANT™ (Synth B): R=0% (unsalted case) and 0% (5% KCl case), both with final rotor surfaces being oil-wet.

Example 5

The following surfactant-solvent blend was prepared in a beaker with a magnetic stirrer, and agitated until the solution was homogeneous.
  5 wt % Geropon™ DOS PG
  13 wt % Antarox™ LA-EP 16
  10 wt % water
  36 wt % solketal
  36 wt % Exxsol™ D100
  Rotor test conducted with the drilling fluid had the following results. RHELIANT™ (Synth B): R=15% (5% KCl case), with final rotor surface being oil-wet.

Example 6

The following surfactant-solvent blend was prepared in a beaker with a magnetic stirrer, and agitated until the solution was homogeneous.
  8.5 wt % Geropon™ DOS PG
  21.5 wt % Antarox™ LA-EP 16
  20 wt % water
  45 wt % Exxsol™ D100
  5 wt % Mackamide™ C5
  Rotor test conducted with the drilling fluid had the following results. RHELIANT™ (Synth B): R=6% (5% KCl case), with final rotor surface being oil-wet.

Example 7

The following surfactant-solvent blend was prepared in a beaker with a magnetic stirrer, and agitated until the solution was homogeneous.

50 wt % butoxyethanol
45 wt % Exxsol™ D100
5 wt % Mackamide™ C5

Rotor tests (unsalted and 5% KCl cases) conducted with the drilling fluid had the following results. RHELIANT™ (Synth B): R=90% (unsalted case) and 42% (5% KCl case), both with final rotor surfaces being oil-wet.

The invention claimed is:

1. A method for removing non-aqueous fluids from a subterranean well having at least one casing string, comprising:
   i. preparing an aqueous spacer fluid, a chemical wash, or both;
   ii. adding a well treatment composition to the aqueous spacer fluid, the chemical wash, or both, the well treatment composition comprising:
      (a) water;
      (b) a lipophilic anionic surfactant;
      (c) a first hydrophilic non-ionic surfactant;
      (d) a second hydrophilic non-ionic surfactant;
      (e) a water-solubilizing solvent;
      (f) a water-immiscible solvent; and
      (g) a lipophilic non-ionic surfactant;
   iii. placing the aqueous spacer fluid, the chemical wash or both containing the well treatment composition in the well such that the aqueous spacer fluid, the chemical wash, or both, flow past the external surface of the casing string, wherein the well treatment composition is homogeneous.

2. The method of claim 1, wherein the concentration of the well treatment composition in the aqueous spacer fluid, the chemical wash, or both is between 0.25% and 20% by weight.

3. The method of claim 1, wherein the lipophilic anionic surfactant comprises oil-soluble alkaline, alkaline earth metal and amine salts of dodecylbenzenesulfonic acid, alkylsulfuric acid, alkylsulfonic, acid, alpha olefin sulfonic acid, alkyl sulfosuccinic acid, alkyl ether sulfosuccinic acid, alkyl ether sulfuric acid, alkyl ether sulfonic acid, carboxylic acid, lignosulfonic acid, phosphonate esters, phosphate esters, phosphonated polyglycol ethers or phosphated polyglycol ethers or combinations thereof, wherein the HLB number is below 30;
   wherein the hydrophilic non-ionic surfactant comprises alkoxylated alcohols, wherein the HLB number is between 12 and 17.

4. The method of claim 1, wherein the second hydrophilic non-ionic surfactant comprises alkoxylated alcohols, wherein the HLB number is between 7 and 14; wherein the water-solubilizing solvent comprises linear small chain alcohols according to the formula $C_xH_{(2x+1)}OH$ with x below 7.

5. The method of claim 1, wherein the water-immiscible solvent comprises aliphatic hydrocarbons.

6. The method of claim 1, wherein the lipophilic non-ionic surfactant comprises alkoxylated alcohols having a water solubility lower than 1 g per liter.

7. The method of claim 1, wherein the well treatment composition further comprises a second solvent comprising branched long-chain alcohols according to the formula $C_xH_{(2x+1)}OH$ with x above 4, propoxylated alcohols, terpenes, pyrrolidones, pyrrolidines, aromatic solvents or halogenated solvents, or combinations thereof.

8. The method of claim 1, wherein a concentration ratio between the lipophilic anionic surfactant and all three non-ionic surfactants is between 1:10 and 10:1.

9. The method of claim 1, wherein a concentration ratio between the lipophilic anionic surfactant and all three non-ionic surfactants is between 1:4 and 2:1.

10. The method of claim 1, wherein the first hydrophilic non-ionic surfactant comprises a first HLB number, and the second hydrophilic non-ionic surfactant comprises a second HLB number that is different than the first HLB number.

11. The method of claim 1, wherein a first concentration of the water is between 5 and 50% by weight, wherein a second concentration of the lipophilic anionic surfactant is between 1 and 75% by weight, wherein a third concentration of the first hydrophilic non-ionic surfactant is between 1 and 75% by weight, wherein a fourth concentration of the second hydrophilic non-ionic surfactant is between 1 and 75% by weight, wherein a fifth concentration of the water-solubilizing solvent is between 3 and 75% by weight, wherein a sixth concentration of the water-immiscible solvent is between 3 and 75% by weight, and wherein a seventh concentration of the lipophilic non-ionic surfactant is between 0.5 and 30% by weight.

\* \* \* \* \*